US010452684B2

(12) United States Patent
Frerking

(10) Patent No.: US 10,452,684 B2
(45) Date of Patent: *Oct. 22, 2019

(54) SEQUENCE ENGINE

(71) Applicant: Walmart Apollo, LLC, Bentonville, AR (US)

(72) Inventor: John Randy Frerking, Prairie Grove, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/475,797

(22) Filed: Mar. 31, 2017

(65) Prior Publication Data

US 2017/0206264 A1    Jul. 20, 2017

Related U.S. Application Data

(63) Continuation of application No. 14/602,420, filed on Jan. 22, 2015, now Pat. No. 9,639,593, which is a
(Continued)

(51) Int. Cl.
*G06F 17/30* (2006.01)
*G06F 16/27* (2019.01)
(Continued)

(52) U.S. Cl.
CPC ............ *G06F 16/273* (2019.01); *G06F 9/546* (2013.01); *G06F 16/178* (2019.01)

(58) Field of Classification Search
CPC ......... G06F 17/30578; G06F 17/30174; G06F 9/546; G06F 16/178; G06F 16/273
See application file for complete search history.

(56) References Cited

U.S. PATENT DOCUMENTS 8,027,922 B2    9/2011  Lee
8,661,083 B2*   2/2014  Singh ...................... G06F 9/546
                                                    709/206
(Continued)

OTHER PUBLICATIONS

United Kingdom Search Report from corresponding GB Application No. GB1310105.0 dated Oct. 31, 2013; 1 page.
(Continued)

*Primary Examiner* — Greta L Robinson
(74) *Attorney, Agent, or Firm* — Schmeiser, Olsen & Watts LLP

(57) ABSTRACT

According to one aspect, embodiments of the invention provide a sequence engine comprising a local queue configured to receive captured data in a first sequence, the captured data including a plurality of individual messages, each message including sequence information representative of a chronological order in which the messages was captured, a coupling facility in communication with the local queue, the coupling facility comprising a plurality of data tables wherein a first one of the plurality of data tables is configured to store the captured data in the first sequence, and a dispatcher in communication with the plurality of data tables and configured to resequence, based on the sequence information, the captured data into a second sequence, wherein the second sequence corresponds to the chronological order in which the plurality of individual messages were captured, and to forward the captured data to a destination database in the second sequence.

13 Claims, 5 Drawing Sheets

Related U.S. Application Data continuation of application No. 13/490,786, filed on Jun. 7, 2012, now Pat. No. 8,972,344.

(51) Int. Cl.
*G06F 16/178* (2019.01)
*G06F 9/54* (2006.01)

(56) References Cited

U.S. PATENT DOCUMENTS

| | | | |
|---|---|---|---|
| 8,671,072 B1* | 3/2014 | Shah | G06F 3/0619 |
| | | | 707/610 |
| 9,973,582 B2* | 5/2018 | Carricarte | H04L 67/1095 |
| 2003/0115276 A1 | 6/2003 | Flaherty et al. | |
| 2006/0010195 A1 | 1/2006 | Mamou et al. | |
| 2008/0147777 A1 | 6/2008 | Azulai | |
| 2010/0131554 A1* | 5/2010 | Cooper | G06F 16/273 |
| | | | 707/770 |
| 2011/0137973 A1 | 6/2011 | Wei et al. | |
| 2013/0042083 A1* | 2/2013 | Mutalik | G06F 17/30162 |
| | | | 711/162 |
| 2013/0332415 A1 | 12/2013 | Frerking | |

OTHER PUBLICATIONS

Guturu, "Architecture and Algorithm for High Performance Fault-Tolerant Replication of Sensitive Military and Homeland Security C31 Database Messages", University of North Texas 2004; 6 pages.
Non-Final Office Action in related U.S. Appl. No. 13/490,786, dated Dec. 2, 2013; 13 pages.
Non-Final Office Action in related U.S. Appl. No. 13/490,786, dated Apr. 18, 2014; 11 pages.
Final Office Action in related U.S. Appl. No. 13/490,786, dated Aug. 19, 2014; 8 pages.
Notice of Allowance in related U.S. Appl. No. 13/490,786, dated Oct. 30, 2014; 8 pages.
Non-Final Office Action in related U.S. Appl. No. 14/602,420, dated Apr. 25, 2016; 13 pages.
Final Office Action in related U.S. Appl. No. 14/602,420, dated Aug. 25, 2016; 7 pages.
Advisory Action in related U.S. Appl. No. 14/602,420, dated Dec. 21, 2016; 5 pages.
Notice of Allowance in related U.S. Appl. No. 14/602,420, dated Dec. 27, 2016; 9 pages.
Office Action in Canadian Patent Application No. 2,818,260 dated Mar. 12, 2019; 4 pages.
"Data Capture Software: Why Automate Data Capture?," IBM, https://www.ibm.com/automation/software/data-capture, download date of Jun. 13, 2019.
"8.5-306-ConfiguringCPTrainingManual.pdf," Retail Control Systems, https://www.retailcontrolsystems.com/wp-content/uploads/2017/05/8.5-306-ConfiguringCPTrainingManual.pdf, download date of Jun. 13, 2019.

* cited by examiner

SEQUENCE ENGINE

CROSS-REFERENCE TO RELATED APPLICATION

This application is a continuation of U.S. patent application Ser. No. 14/602,420 entitled "SEQUENCE ENGINE," filed on Jan. 22, 2015, which is a continuation of U.S. patent application Ser. No. 13/490,786 and issued as U.S. Pat. No. 8,972,344 entitled "SEQUENCE ENGINE," filed on Jun. 7, 2012, each continuation application incorporated herein by reference in its entirety.

BACKGROUND OF THE DISCLOSURE

Field of the Invention

Aspects of the present invention relate to a system and method for providing accurate real-time data replication.

Discussion of Related Art

Replication is the process of sharing information so as to ensure consistency between redundant resources, such as software or hardware components, to improve reliability, fault-tolerance, or accessibility. Data replication is the process of storing substantially identical data on multiple storage devices to improve dependability and reliability of the data. For example, a data replication process may copy and transfer data from one database to another database in order to create a dependable backup of the data.

SUMMARY

Aspects in accord with the present invention are directed to a data replicator comprising a sequence engine comprising a local queue configured to receive captured data in a first sequence, the captured data including a plurality of individual messages, each one of the plurality of individual messages including sequence information representative of a chronological order in which the plurality of individual messages was captured, a coupling facility in communication with the local queue, the coupling facility comprising a plurality of data tables wherein a first one of the plurality of data tables is configured to store the captured data in the first sequence, and a dispatcher in communication with the plurality of data tables and configured to resequence, based on the sequence information in the captured data, the captured data into a second sequence, wherein the second sequence corresponds to the chronological order in which e plurality of individual messages were captured, and to forward the captured data to a destination database in the second sequence.

According to one embodiment, the data replicator further comprises at least one system exit configured to be in communication with a source database and to capture data received at the source database in real time. In one embodiment, the data replicator further comprises a configuration control system in communication with the at least one system exit, the configuration control system configured to receive the captured data from the at least one system exit and to modify each one of the plurality of individual messages to include the sequence information. In another embodiment, the data replicator further comprises a message broker in communication with the configuration control system, the message broker configured to receive the modified plurality of individual messages from the configuration control system, and to convert the modified plurality of individual messages into a format of a destination database. In one embodiment, the first sequence does not correspond to the chronological order in which the plurality of individual messages were captured by the at least one system exit.

According to another embodiment, the sequence engine further comprises a message transfer component configured to transfer the converted and modified plurality of individual messages in the first sequence from the local queue to the first one of the plurality of data tables. In one embodiment, the coupling facility is further configured to store, within a second one of the plurality of data tables, a control file including the sequence information representative of the chronological order in which each one of the plurality of individual messages was captured by the at least one system exit and wherein the control file is configured to identify, based on the sequence information within the control file, sequence information associated with a next sequential message to be forwarded to the destination database in the second sequence.

According to one embodiment, the sequence engine further comprises at least one service client in communication with the first and second ones of the plurality of data tables and configured to be in communication with the destination database, wherein the dispatcher is further configured to scan the converted and modified plurality of individual messages stored in the first one of the plurality of data tables, compare the sequence information of each one of the converted and modified plurality of individual messages within the first one of the plurality of data tables to the sequence information identified in the control file as associated with the next sequential message to be forwarded to the destination database in the second sequence, and in response to determining that a scanned messages sequence information matches the sequence information identified in the control file, passing the matched sequence information to the at least one service client. In one embodiment, upon receiving the matched sequence information, the service client is configured to retrieve the individual message associated with the matched sequence information from the first one of the plurality of data tables and forward the retrieved message to the destination database. In another embodiment, upon receiving an indication that the individual message forwarded to the destination database was successfully applied to the destination database, the service client is configured to update, within the control file, the identification of the sequence information associated with the next sequential message to be forwarded to the destination database in the second sequence.

According to another embodiment, the coupling facility further comprises a third one of the plurality of data tables, wherein the third one of the plurality of data tables includes a plurality of parameters which is defined to configure the sequence engine. In one embodiment, the sequence engine further comprises an administration component which is configured to define the plurality of parameters.

According to one embodiment, the sequence engine further comprises a process controller and wherein the process controller is configured to control the flow of data within the sequence engine. In one embodiment, the process controller includes a queue throttle and wherein the queue throttle is configured to monitor a number of messages stored in the local queue and close a channel between the local queue and the at least one system exit in response to a determination that the number of messages stored in the local queue exceeds a first threshold. In another embodiment, the queue throttle is further configured to open the previously closed channel between the local queue and the at least one system exit in response to a determination that the number of messages stored in the local queue is less than a second threshold. In one embodiment, in response to an error condition, the process controller is further configured to enter the sequence engine into a delay state for a period of time.

Another aspect in accord with the present invention is directed to a data replicator comprising a sequence engine comprising a local queue configured to receive captured data in a first sequence, the captured data including a plurality of individual messages, each one of the plurality of individual messages including sequence information representative of a chronological order in which each one of the plurality of individual messages was captured, a coupling facility in communication with the local queue, the coupling facility comprising a plurality of data tables wherein a first one of the plurality of data tables is configured to store the modified plurality of individual messages in the first sequence, and means for resequencing the captured data into a second sequence based on the chronological order by which each one of the plurality of individual messages was received and for applying the captured data to a destination database in the second sequence.

According to one embodiment, the data replicator further comprises at least one system exit configured to be in communication with a source database and to capture data received at the source database in real time. In one embodiment, the data replicator further comprises a configuration control system in communication with the at least one system exit, the configuration control system configured to receive the captured data from the at least one system exit and to modify each one of the plurality of individual messages to include the sequence information. In another embodiment, the data replicator further comprises a message broker in communication with the configuration control system, the message broker configured to receive the modified plurality of individual messages from the configuration control system, to convert the modified plurality of individual messages into a format of a destination database, and to transmit the converted and modified plurality of messages captured data to the sequence engine.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
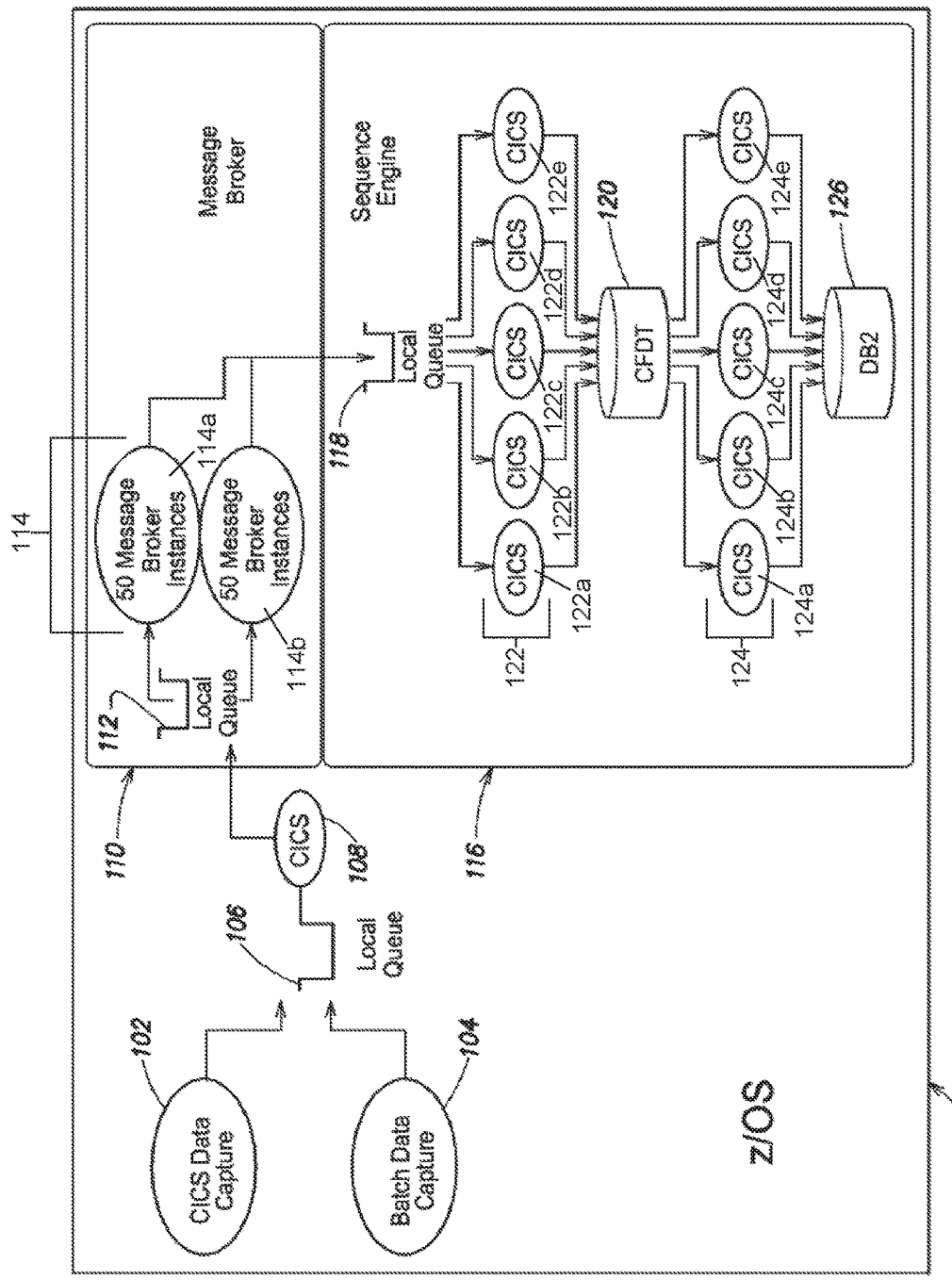
FIG. 1 illustrates a block diagram of one embodiment of a data replicator in accordance with one aspect of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, data replication is a common process by which data is copied and transferred from a source to a destination. In some embodiments, the data replication process is performed between two databases. In some embodiments, the data replication process is performed between two types of databases (e.g., a source Information Management System (IMS) database and a destination DB2 database). Accuracy in creating a nearly identical backup while performing a data replication process is important to insure reliability and dependability of the backup data.

A common data replication process is a batch data replication process by which entire segments of data from the source are copied and transferred together at the same time in order to preserve the integrity and order of the individual pieces of data within each segment. However, such a batch data replication process may be overly cumbersome, slow and inefficient as the batch data replication process is not performed in real-time and the data is handled in relatively large segments.

Therefore, embodiments described herein, provide a sequence engine capable of sequentially processing individual data replication records in a real-time process.

FIG. 1 illustrates a block diagram of one embodiment of a data replicator 100 in accordance with one aspect of the present invention. According to one embodiment, the data replicator 100 performs data replication between an IMS database and a DB2 database; however, in other embodiments, replication may be performed between any types of databases. According to one embodiment, the data replicator 100 is executed in a z/OS Parallel Sysplex using Customer Information Control System (CICS)/Transaction Server (TS), and is built on features such as Open Transaction Environment (OTE), Coupling Facility Data Tables (CFDT), Global Resource Serialization (GRS), TCP/IP Sysplex distribution and Work Load Manager (WLM).

According to one embodiment, the data replicator 100 includes system exits configured to capture data from a source IMS database. In one embodiment, the data replicator 100 includes a CICS Global User Exit (GLUE) 102 and an IMS batch exit 104. The CICS GLUE 102 and the IMS batch exit 104 are in communication with a local Message Queue (MQ) 106. The local MQ 106 is in communication with a modification CICS 108. The modification CICS 108 is in communication with a message broker 110.

According to one embodiment, the message broker 110 includes a message broker local MQ 112 in communication with multiple message broker instances 114. In one embodiment, the message broker 110 includes 100 message broker instances 114; however, in other embodiments, the message broker 110 may include any number of message broker instances 114. The message broker instances 114 are in communication with a sequence engine 116.

According to one embodiment, the sequence engine 116 includes a sequence engine local MQ 118. The sequence engine local MQ 118 is in communication with a coupling facility 120 (or caching mechanism) via CICS web services 122. According to one embodiment, the sequence engine 116 may include any number of CICS web service instances 122.

According to one embodiment, the coupling facility includes a plurality of Coupling Facility Data Tables (CFDT). The coupling facility 120 is in communication with a destination DB2 database 126 via CICS DB2/Create, Read, Update, Delete (CRUD) service clients 124.

The GLUE 102 and IMS batch exit 104 capture data from IMS source database updates in real-time. For example, in one embodiment, where the IMS source database and the DB2 destination database are configured to store Purchase Order (PO) information; PO update messages which are sent to the IMS source database to update the IMS source database are captured by the GLUE 102 and/or IMS batch exit 104 in real-time (i.e. as it is received by the IMS source database). The captured data is stored in the local MQ 106.

The modification CICS 108 modifies the captured data to include identification information. For example, in one embodiment, where the captured data includes PO update messages and each PO update message includes a reference PO number, the modification CICS 108 attaches a sequence number to the PO number of each PO update message. In one embodiment, the sequence numbers are attached in chronological order to keep track of the order in which the PO update messages were captured. According to one embodiment, a list of each PO number and its attached sequence number is maintained in a control file of the sequence engine 116 to keep track of the order in which the PO update messages should be applied to the destination database.

The modified captured data is written to the message broker local MQ 112 of the message broker 110. According to one embodiment, the modified captured data stored in the message broker local MQ 112 is still in chronological order of when the data was captured. An asynchronous process of the message broker 110 utilizes multiple instances 114 (e.g. 100) to convert the modified captured data into a proper format to be stored in the destination database (e.g. the DB2 database 126). In one embodiment, the modified captured data is converted into XML format; however, in other embodiments, the modified captured data may be converted into any appropriate format required by the destination database.

The converted captured data is forwarded to the sequence engine local MQ 118 of the sequence engine 116. Due to the use of multiple asynchronous message broker instances 114 to convert the data into an appropriate format, the converted captured data may be forwarded to the sequence engine local MQ 118 out of sequential order (i.e. not in the order of which it was intended to be applied to the destination database). To insure database integrity between the source (IMS) and destination (DB2) databases, it may be necessary to apply the converted captured data to the destination database in sequential (i.e. chronological) order, despite the converted captured data being received at the sequence engine 116 out of sequence. For example, the data within the destination database may become compromised if an update instruction is performed, out of order, before an insert instruction.

Therefore, at least one embodiment described herein provides a sequence engine 116 capable of re-sequencing the converted captured data into chronological order in order to appropriately apply the converted captured data to the destination database in a fluid and dynamic manner.

The sequence engine 116 forwards the converted captured data from the sequence engine local MQ 118 to the coupling facility 120 (including CFDT) via multiple instances of CICS web services 122. According to one embodiment, the CICS web services 122 allow for flexibility in design within a single Sysplex or multiple Sysplexes. For example, when the sequence engine 116 is operating in the same Sysplex as the rest of the data replicator 100, the sequence engine 116 can either execute in the same Logical Partition (LPAR), in a remote LPAR, a remote CICS region, or as a locally optimized service of a CRUD/DB2 controller.

The coupling facility 120, utilizing CFDT and the control file (including PO and sequence number combinations as discussed above), re-sequences the converted captured data into chronological order (based on the previously created control file which indicates the correct sequential order of how the captured data should be applied) and applies the re-sequenced data to the destination DB2 database 126 in sequential order via the CICS DB2/CRUD service clients 124. The re-sequencing of the converted captured data by the sequence engine 116 is discussed in greater detail below.

Figure 2:
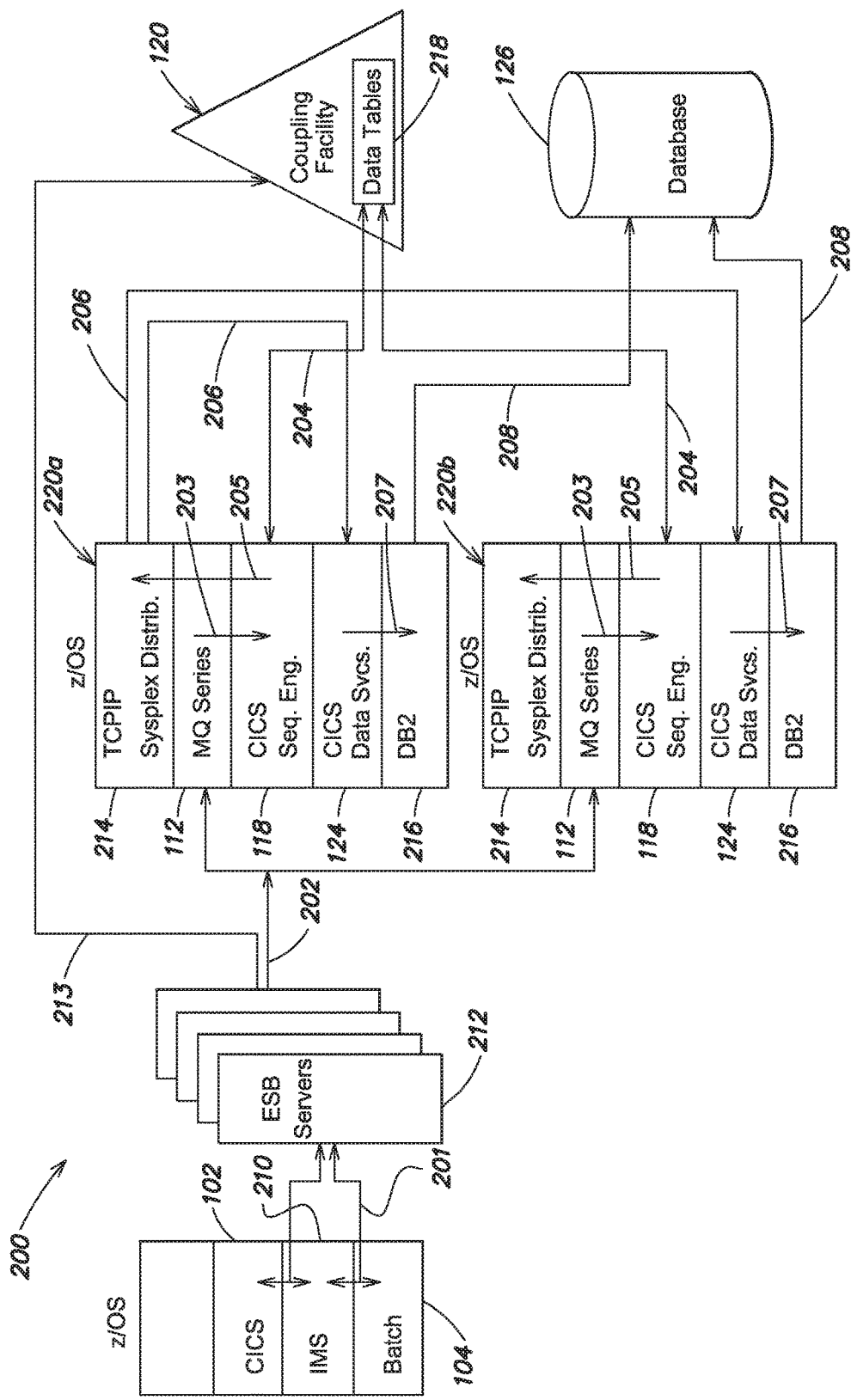
FIG. 2 is a flow chart illustrating data flow during a process for replicating data in accordance with one embodiment of the present invention.

FIG. 2 is a flow chart 200 illustrating data flow during a process for replicating data in accordance with one embodiment of the present invention. FIG. 2 illustrates the different states of data flow during different phases of a data replication process in accordance with one embodiment of the present invention.

At state 201, the GLUE 102 and IMS batch exit 104 capture data from IMS source database updates 210 in real-time. The captured data is forwarded to a local MQ (e.g., local MQ 106) and a modification CICS (e.g., modification CICS 108). According to one embodiment, the local MQ and modification CICS are located on an Enterprise Service Bus (ESB) Server 212; however, in other embodiments, the local MQ and modification CICS may be located differently.

The modification CICS located on the ESB server 212 translates and augments the received captured data as described above (i.e. the modification CICS adds sequential numbers to the individual messages of the captured data, the sequential numbers indicating the order in which each message should be applied to the destination database). According to one embodiment a control file 213 monitoring the order in which the captured data was received is sent from the ESB servers 212 to the coupling facility 120. In one embodiment, the control file 213 is stored in a CFDT 218.

At state 202, the modified captured data is sent to the message broker local MQ 112 of the message broker 110. The message broker 110 converts the received modified captured data into a format (e.g. XML) appropriate for the destination database. As described above, according to one embodiment, the message broker 110 utilizes an asynchronous process with multiple instances 114 to convert the modified captured data into a proper format to be stored in the destination database.

At state 203, the converted captured data is forwarded from the message broker 110 to the sequence engine local MQ 118 of the sequence engine 116. According to one embodiment, as the message broker 110 utilizes an asynchronous process with multiple instances 114 to convert the modified captured data into a proper format to be stored in the destination database, the converted captured data received by the sequence engine local MQ 118 may not be in chronological order of how the captured data needs to be applied to the destination database (i.e. the captured data is out-of-sequence).

Therefore, at state 204, the out-of-sequence data is forwarded from the sequence engine local MQ 118 to the coupling facility 120, via multiple instances of CICS web services 122. Utilizing CFDT and the control file 213 within the coupling facility 120, the sequence engine 116 re-sequences the data to place the data in the correct order (i.e. chronologically) to be applied to the destination database 126.

At state 205, the sequence engine 116 forwards correctly sequenced data from the coupling facility 120 (i.e. a piece of data that is next in line, chronologically, to be applied to the destination database 126) to data services via a Sysplex Distributor.

At state 206, the correctly sequenced data is forwarded to a CICS DB2/CRUD service client 124 which, at step 207, calls a CRUD/DB2 controller 216 with the correctly sequenced data. At step 208, the CRUD/DB2 controller 216 records the correctly sequenced data (e.g. a PO update) in the destination database 126 (e.g. a DB2 database). The operation and configuration of the sequence engine 116 is discussed in greater detail below.

As illustrated in FIG. 2, multiple instances of the data replication process described above may be occurring at the same time (e.g. represented by dual instances 220a and 220b). In such a situation, the single coupling facility 120 (including CFDT) still keeps track of all of the different messages to insure that each instance 220a, 220b is currently processing the correct message and that all messages are replicated in correct order.

Figure 3:
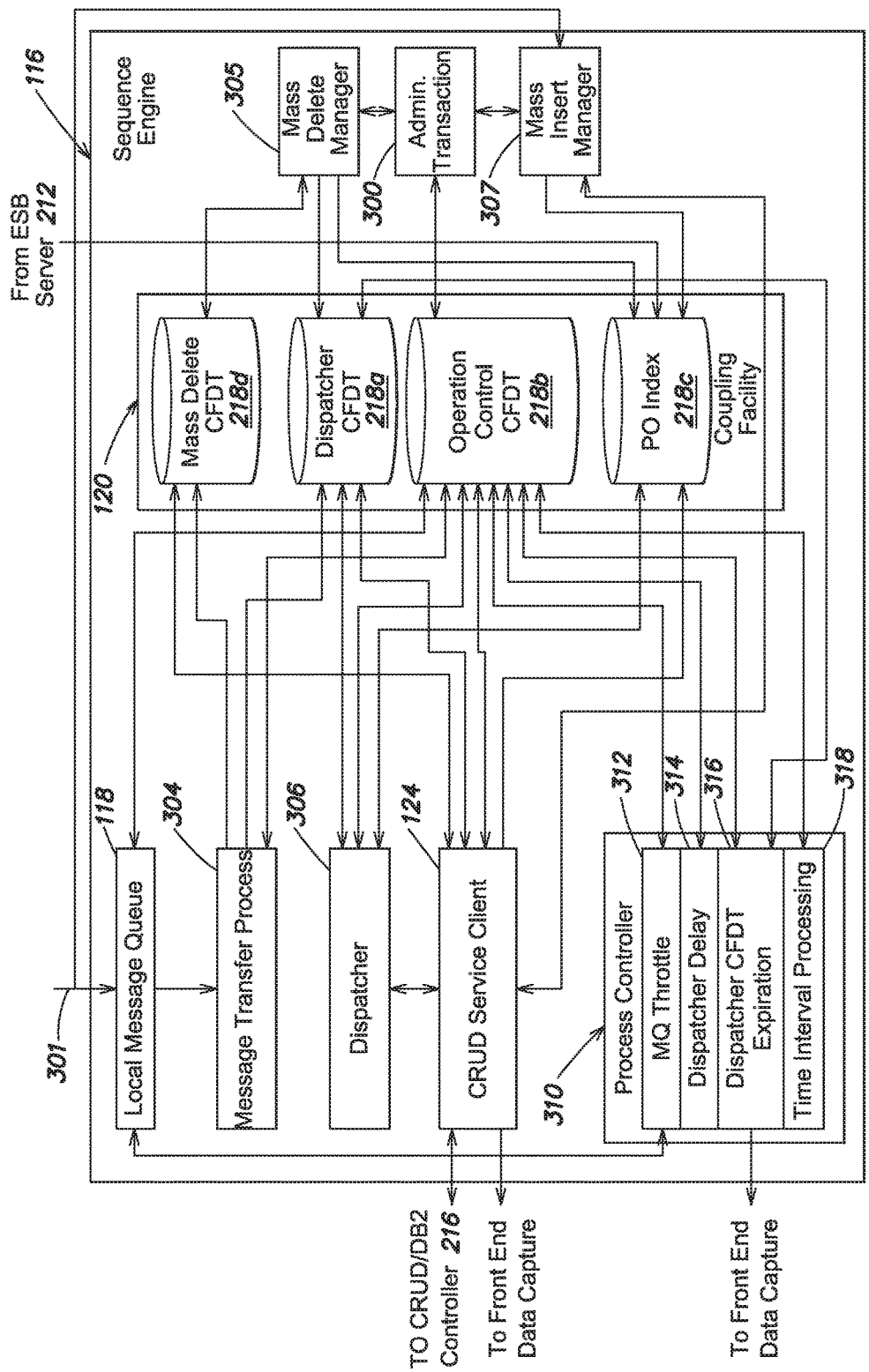
FIG. 3 is a block diagram of a sequence engine in accordance with one embodiment of the present invention.

FIG. 3 is a block diagram of a sequence engine 116 in accordance with one embodiment of the present invention. The sequence engine 116 includes a local message queue 118 in communication with a coupling facility 120. According to one embodiment, the coupling facility includes a plurality of Coupling Facility Data Tables (CFDT) 218. In one embodiment, the coupling facility 120 includes a dispatcher CFDT 218a, an operation control CFDT 218b, and a PO index CFDT 218c. However, in other embodiments, the coupling facility 120 may include any number and/or type of CFDT.

The local message queue 118 is in communication with the operation control CFDT 218b and a message transfer process 304. The message transfer process is in communication with the dispatcher CFDT 218a and the operation control CFDT. The sequence engine 116 also includes a dispatcher 306 in communication with the dispatcher CFDT 218a, the operation control CFDT 218b, the PO index CFDT 218c, and a CRUD service client 124. The CRUD service client 124 is in communication with the dispatcher CFDT 218a and the operation control CFDT 218b. According to one embodiment, the CRUD service client 124 is also in communication with a CRUD/DB2 controller 216 (as discussed with regards to FIG. 2) and a front end data capture process (e.g., including GLUE 102 and IMS batch exits 104 as discussed above with regards to FIGS. 1 and 2).

In one embodiment, the sequence engine 116 also includes a process controller 310. According to one embodiment, the process controller 310 includes a Message Queue (MQ) throttle 312, a dispatcher delay component 314, a dispatcher CFDT expiration component 316 and a time interval processing component 318. The MQ throttle 312 is in communication with the operation control CFDT 218b and the local message queue 118. The dispatcher delay component 314 is in communication with the operation control CFDT 218b. The dispatcher CFDT expiration component 316 is in communication with the operation control CFDT 218b, the dispatcher CFDT 218a and a front end data capture process (e.g., including GLUE 102 and IMS batch exits 104 as discussed above with regards to FIGS. 1 and 2). The time interval processing component 318 is in communication with the operation control CFDT 218b.

According to one embodiment, the PO index CFDT is in communication with the ESB server 212.

According to another embodiment, the sequence engine 116 also includes a mass delete CFDT 218d and a mass delete manager 305. The mass delete CFDT is in communication with the message transfer process component 304, the CRUD service client 124, and the mass delete manager 305. The mass delete manager 305 is in communication with the dispatcher CFDT 218a and the PO index CFDT 218c.

According to another embodiment, the sequence engine 116 includes a mass insert manager 307. The mass insert manager 307 is in communication with the CRUD service client 124, the PO index CFDT 218c and the channel 301 between the message broker 110 and the sequence engine 116.

According to another embodiment, the sequence engine 116 also includes an administration transaction component 300 which is in communication with the operation control CFDT 218b, the mass delete manager 305 and the mass insert manager 307.

The re-sequencing process performed by the sequence engine 116 is controlled by the administration transaction component 300. In one embodiment, the administration transaction component 300 also provides a user with documentation related to the operation of the re-sequencing process. The administration transaction component 300 defines a variety of control parameters to uniquely configure and control the sequence engine 116 dynamically (i.e. in real-time). For example, in one embodiment, the administration transaction component 300 utilizes over seventy-five control parameters to configure and control the sequence engine 116. According to one embodiment, the control parameters are utilized to uniquely configure the sequence engine 116 for use in a specific country or division environment.

According to one embodiment, the control parameters defined by the administration transaction component 300 (and other components of the sequence engine 116) are stored in the operation control CFDT 218b. In one embodiment, the control parameters defined by the administration transaction component 300 are monitored by each other component of the sequence engine 116. For example, in one embodiment, prior to performing a task, a component of the sequence engine 116 checks the control parameters within the operation control CFDT 218b and configures itself based on at least one of the control parameters.

As described above, out-of-sequence messages are received by the sequence engine 116 through a channel 301 from the message broker 110. The out-of-sequence messages are stored in the local message queue 118.

The message transfer process component 304 retrieves the out-of-sequence messages from the local message queue 118 and writes the messages to the dispatcher CFDT 218a. In one embodiment, the message transfer process component 304 utilizes CICS web services 122 (as discussed with reference to FIG. 1) to write the messages to the dispatcher CFDT 218a. According to one embodiment, despite being currently out-of-sequence, each message written to the dispatcher CFDT 218a has previously been indexed by a key. For example, in one embodiment as discussed above, where the received messages correspond to PO update messages, each received message is indexed within a control file by its associated PO number and an attached sequence number, where the sequence number corresponds to the order in which the PO update message should be applied to the destination database. In one embodiment, the control file is maintained within the PO index CFDT 218c and updates to the control file are sent from the ESB server 212 to the PO index CFDT 218c.

According to one embodiment, the dispatcher CFDT includes a finite amount of storage. In such an embodiment, where the message transfer process component 304 attempts to write a message to the dispatcher CFDT 218a but the dispatcher CFDT 218a is full, the dispatcher CFDT 218a will return a "file full" condition to the message transfer process component 304. Upon receiving a "file full" condition from the dispatcher CFDT 218a, the message transfer process component 302 will attempt to write the message again after a predetermined period of time. The predetermined period of time is defined by the administration transaction component 300 and retrieved from the operation control CFDT 218b by the message transfer process component 304. Similarly, should the local message queue 118 be empty when the message transfer process component 304 attempts to retrieve a message, the message transfer process component 304 will attempt to retrieve a message from the local message queue 118 again after a predetermined period of time, the predetermined period of time defined by the administration transaction component 302 and stored in the operation control CFDT 218b.

According to one embodiment, the number of active message transfer process component tasks across the Sysplex is controlled by a counter set by the administration transaction component 302 by using a global enqueue.

The dispatcher component 306 scans each message stored within the dispatcher CFDT 218a to determine which message should next be applied to the destination database. According to one embodiment, for each scanned message, the dispatcher component 306 compares the message to the previously created index to determine if the message is the next message which should be applied to the destination database. For example, in one embodiment as discussed above, where the messages stored within the dispatcher CFDT 218a are PO update messages including attached sequence numbers, a control file index including the PO update messages corresponding PO numbers and sequence numbers (where the sequence numbers correlate to the chronological order in which each message should be applied to the destination database) is stored in the PO index CFDT 218c. The PO index CFDT 218c maintains the control file index of the PO numbers and their associated sequence numbers and hence also monitors, via the sequence numbers, the order in which each PO should be updated in the destination database. Accordingly, the PO index CFDT 218c also keeps track of the value of the next sequence number (and corresponding PO number) which should be updated in the destination database.

In one embodiment, for each scanned message, the dispatcher component 306 compares the sequence number attached to the message to the sequence number identified by the PO index CFDT 218c as the next sequence number (and corresponding PO number) which should be updated in the destination database. If the sequence numbers do not match, the dispatcher component 306 scans the next message from the dispatcher CFDT 218a. If the sequence numbers match, the dispatcher component 306 starts a CRUD service client 124 and passes the PO number and attached sequence number to the CRUD service client 124.

According to one embodiment, if the dispatcher component 306 receives an "end of file" condition while reading from the dispatcher CFDT 218a, the dispatcher component 306 restarts reading from the dispatcher CFDT 218a after a predetermined period of time. The predetermined period of time is defined by the administrative transaction component 300 and is retrieved from the operation control CFDT 218b.

According to one embodiment, the dispatcher component 306 also manages the number of active CRUD service clients 124 in each region/server. In one embodiment the dispatcher component 306 manages the number of active CRUD service clients 124 by using a "max task" counter set by the administration transaction component 300 and retrieved from the operation control CFDT 218b. Should the dispatcher component 306 determine that the number of CRUD service clients 124 in its region/server has reached the "max task" value; the dispatcher component 306 will restart scanning messages upon expiration of a predetermined period of time. The predetermined period of time is defined by the administration transaction component 300 and is retrieved from the operation control CFDT 218b.

According to one embodiment, the dispatcher component 306 may be placed in a "dispatcher delay" mode. In such a "dispatcher delay" mode, the dispatcher component 306 restarts scanning messages upon expiration of a predetermined period of time. The predetermined period of time is defined by the administration transaction component 300 and is retrieved from the operation control CFDT 218b. In one embodiment, the dispatcher component 306 is placed in a "dispatcher delay" mode in response to a CRUD service client 124 setting a "dispatcher delay" indicator in the operation control CFDT 218b. According to one embodiment, the a CRUD service client 124 may set a "dispatcher delay" indicator in response to the CRUD/DB2 controller 216 returning a "database unavailable" condition code to the CRUD service client 124.

According to one embodiment, the number of active dispatcher component 306 tasks across the Sysplex is controlled by a counter set by the administration transaction component 300, by using a global enqueue.

As described above, upon the dispatcher component 306 determining that the sequence number of a scanned message matches the next chronological sequence number identified in the PO index CFDT 218c, the dispatcher component 306 starts a CRUD service client 124 and passes the corresponding PO number and associated matched sequence number to the CRUD service client 124. Based on the PO number and sequence number received from the dispatcher 306, the CRUD service client 124 retrieves the message associated with the PO and sequence numbers from the dispatcher CFDT 218a and locks (or "owns") the PO in the dispatcher CFDT 218a until all matching POs are processes or until a "gap" is encountered. The CRUD service client 124 executes a web service call to the CRUD service controller 216 and forwards the message(s) associated with the PO and sequence numbers to the CRUD service controller 216 to be applied to the destination database.

According to one embodiment, after the CRUD service controller 216 successfully applies the message to the destination database, the CRUD service controller 216 sends a good return code to the CRUD service client 124. Upon receiving a good return code, the CRUD service client 124 updates the value of the sequence number, identified by the PO index CFDT 218c, which is associated with the PO number that should be updated next in the destination database. In one embodiment, the value of the sequence number which is associated with the PO number that should be applied next to the destination database is incremented. After the sequence number of the next chronological update, identified by the PO index CFDT 218c, is updated, the dispatcher 306 again begins scanning messages within the dispatcher CFDT 218 in an effort to find a sequence number that matches the sequence number identified by the PO index CFDT 218*c*. When a matching sequence number is identified, the write process to the destination database begins again.

According to one embodiment, a CRUD service client 124 may receive a return code indicating that the "database is not accessible". In such a situation, the CRUD service client 124 sets a flag within the operation control CFDT 218*b* indicating that the dispatcher 306 should be placed in a "dispatcher delay" status (as discussed above).

According to another embodiment, when the CRUD service client 124 receives an unfavorable return code from the CRUD controller 216, the corresponding PO number is flagged as "in error" and a message is written to notify the front end data capture process to not process any more updates for the "in error" PO number.

In addition to the administration transaction component and the operation control CFDT 218*b*, certain aspects of the sequence engine 116 may also be controlled by the process controller 310. According to one embodiment and as discussed above, the process controller 310 includes an MQ throttle 312, a dispatcher delay component 314, a dispatcher CFDT expiration component 316 and a time interval processing component 318.

As described above, the re-sequencing process performed by the sequence engine 116 begins when the sequence engine 116 receives out-of-sequence messages from the message broker 110 via a channel 301 and the messages are stored in the local message queue 118. According to one embodiment, the depth of the local message queue 118 (i.e. the number of messages allowed to be stored in the queue) is a finite number. In one embodiment the finite depth of the local message queue 118 is set by a MQ administration system.

According to one embodiment, messages in the dispatcher CFDT 218*a* received in real-time can begin to accumulate due to high volumes of database updates and scheduled or unscheduled outages of the target database. If the dispatcher CFDT 218*a* becomes full, the message transfer process 304 may be unable to write additional messages from the local message queue 118 to the dispatcher CFDT 218 and as a result, messages in the local message queue 118 will also begin to accumulate. If the local message queue 118 is allowed to become full, then additional messages received at the local message queue 118 may be lost. Therefore, the MQ throttle monitors messages stored on the local message queue 118 and controls the flow of messages into the sequence engine 116 to prevent data loss.

According to one embodiment, the MQ throttle 312 of the process controller 310 monitors the depth and the number of messages stored in the local message queue 118. When the MQ throttle 312 determines that the number of messages within the local message queue 118 exceeds a "queue HI" limit, the MQ throttle 312 closes the channel 301 between the message broker 110 and the sequence engine 116 to prevent messages from being lost. In one embodiment the "queue HI" limit is set by the administration transaction component 300 and is retrieved from the operation control CFDT 218*b*.

When the number of messages within the local message queue 118 is less than the "queue LO" limit, the MQ throttle 312 opens the channel 301 between the message broker 110 and the sequence engine 116 to allow new messages to be received by the local message queue 118. In one embodiment the "queue LO" limit is set by the administration transaction component 300 and is retrieved from the operation control CFDT 218*b*.

According to one embodiment and as discussed above, a CRUD service client 124 may receive a return code from the CRUD/DB2 controller 216 indicating that the "database is not accessible". In such a situation, the CRUD service client 124 sets a flag within the operation control CFDT 218*b* indicating that the dispatcher 306 should be placed in a "dispatcher delay" status. The dispatcher delay component 314 monitors the "dispatcher delay" indicator in the operation control CFDT as set by the CRUD service client 124. When a "dispatcher delay" is indicated, the dispatcher delay component 314 will reset (i.e. turn off) the "dispatcher delay" indicator in the operation control CFDT when the "dispatcher delay" interval has expired. In one embodiment the "dispatcher delay" interval is set by the administration transaction component 300 and is retrieved from the operation control CFDT 218*b*.

According to one embodiment, the dispatcher CFDT expiration component 316 scans the dispatcher CFDT 218*a* on time intervals set by the administration transaction component 300 and expire or deletes messages that have been in the dispatcher CFDT 218*a* for longer than a duration set by the administration transaction component 300. In one embodiment, when a message is expired or deleted, a message is written to notify the front end data capture process to not process any updates for the corresponding PO number.

According to one embodiment, the time interval processing component 318 allows the owner of the sequence engine 116 to configure the number of concurrent dispatcher components 306 and/or concurrent CRUD service clients 124 to values different from the default values assigned for these tasks. In one embodiment, the administration transaction component sets time intervals with a beginning time, duration, number of dispatcher components 306 (across the Sysplex) and number of CRUD service clients 124 (in each region/server). The time interval processing component 318 sets the operation control CFDT 218*b* with the special dispatcher component 306 and CRUD service client 124 values during the duration of the time interval; however, upon expiration of the time interval, the time interval processing component 318 resets the operation control CFDT 218*b* with the default values. In one embodiment, this allows the owner of the sequence engine to customize the amount of processing power designated to handle large volumes of input due to scheduled or anticipated work load.

According to some embodiments, the sequence engine 116 may treat captured data it receives from the message broker differently in response to the captured data having a specific characteristic. For example, in one embodiment, the sequence engine 116 may treat captured PO update messages including batch jobs issuing "mass delete" requests differently. As discussed above with regards to FIG. 3, in one embodiment the sequence engine 116 includes a mass delete CFDT 218*d* and manager 305. While most captured data is transferred from the message transfer process component 304 to the dispatcher CFDT 218*a* to be processed by the dispatcher component 306 and subsequent CRUD service clients 124 (as discussed above), captured PO update messages including batch jobs issuing "mass delete" requests are transferred from the message transfer process 304 to the mass delete CFDT 218*d*. The mass delete manager 305 locks (or "owns") a PO update message in the mass delete CFDT 218*d* and calls a CRUD service client 124 for the PO update message directly (i.e. rather than having the dispatcher 306 call a CRUD service client 124). According to one embodiment, the sequence engine 116 can include multiple mass delete managers 305 and the number of active/concurrent mass delete managers 305 is controlled by the administration transaction component 300.

Once called by the mass delete manager 305, the CRUD service client 124 operates as discussed above to update the destination database per the "mass delete" requests. Once the CRUD service client 124 provides a successful return code, the mass delete manager 305 deletes all outstanding messages (requests) within the dispatcher CFDT 218a which are associated with the PO update message (including "mass delete") currently being processed and also deletes the corresponding PO entries from the PO index CFDT. According to one embodiment, the mass delete manager 305 operates the same as discussed above with regards to "reprocess" logic due to database lock/contention issues and "dispatcher delay" processing.

In another embodiment, the sequence engine 116 may treat captured PO update messages including batch jobs issuing "mass insert" requests differently. For example, as discussed above with regards to FIG. 3, in one embodiment the sequence engine 116 includes a mass insert manager 307. While most captured data is received by the message transfer process component 304 and transferred from the message transfer process component 304 to the dispatcher CFDT 218a to be processed by the dispatcher component 306 and subsequent CRUD service clients 124 (as discussed above), messages that are a result of batch jobs issuing "mass insert" requests are received and processed by the mass insert manager 307 and are not transferred to any CFDT. According to one embodiment, the sequence engine 116 includes multiple mass insert managers 307 and the number of active/concurrent mass insert managers 307 is controlled by the administration transaction component 300.

The mass insert manager 307 calls a CRUD service client 124 directly for the "mass insert request" (i.e. rather than having the dispatcher 306 call a CRUD service client 124). Once called by the mass insert manager 307, the CRUD service client 124 operates as discussed above to update the destination database per the "mass insert" request. Once the CRUD service client 124 provides a successful return code, the mass insert manager 307 creates a corresponding PO entry in the PO index table CFDT. In one embodiment, the PO entry is assigned a pre-defined sequence number. According to one embodiment, the pre-defined sequence number is "1"; however, in other embodiments, the pre-defined sequence number may be defined differently. According to one embodiment, the mass insert manager 307 operates the same as discussed above with regards to "reprocess" logic due to database lock/contention issues and "dispatcher delay" processing.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 4:
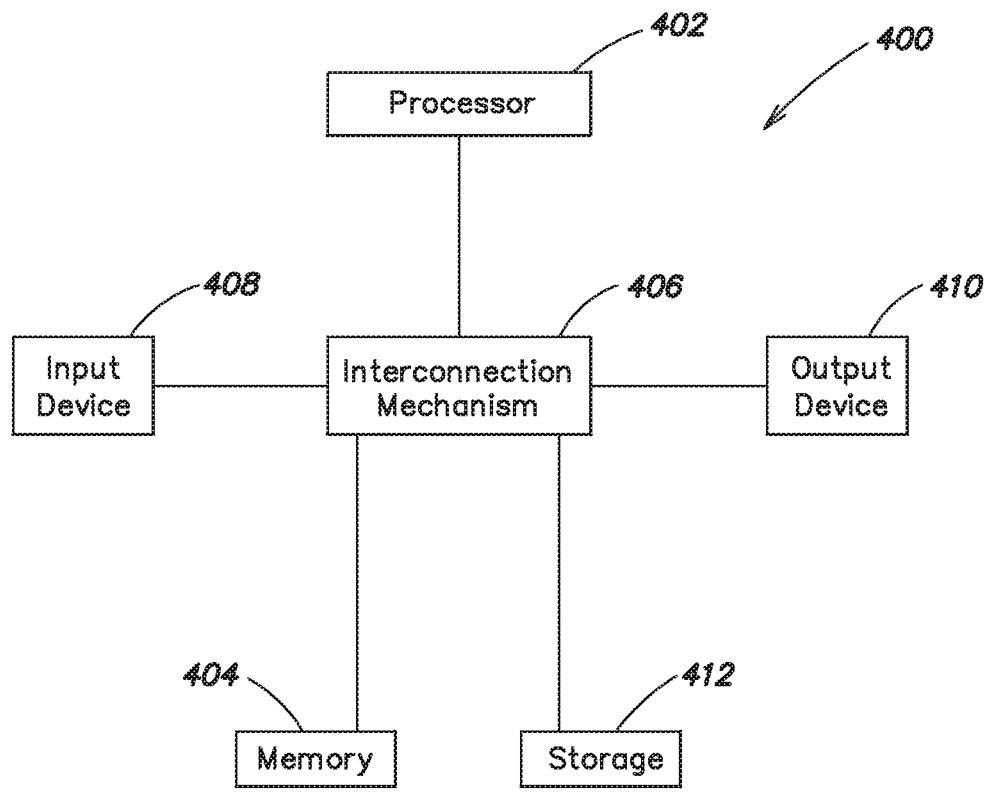
FIG. 4 is a block diagram of a general-purpose computer system upon which various embodiments of the invention may be implemented.

For example, various aspects of the invention may be implemented as specialized software executing in a general-purpose computer system 400 such as that shown in FIG. 4. The computer system 400 may include a processor 402 connected to one or more memory devices 404, such as a disk drive, memory, or other device for storing data. Memory 404 is typically used for storing programs and data during operation of the computer system 400. Components of computer system 400 may be coupled by an interconnection mechanism 406, which may include one or more busses (e.g., between components that are integrated within a same machine) and/or a network (e.g., between components that reside on separate discrete machines). The interconnection mechanism 406 enables communications (e.g., data, instructions) to be exchanged between system components of system 400. Computer system 400 also includes one or more input devices 408, for example, a keyboard, mouse, trackball, microphone, touch screen, and one or more output devices 410, for example, a printing device, display screen, and/or speaker. In addition, computer system 400 may contain one or more interfaces (not shown) that connect computer system 400 to a communication network (in addition or as an alternative to the interconnection mechanism 406).

Figure 5:
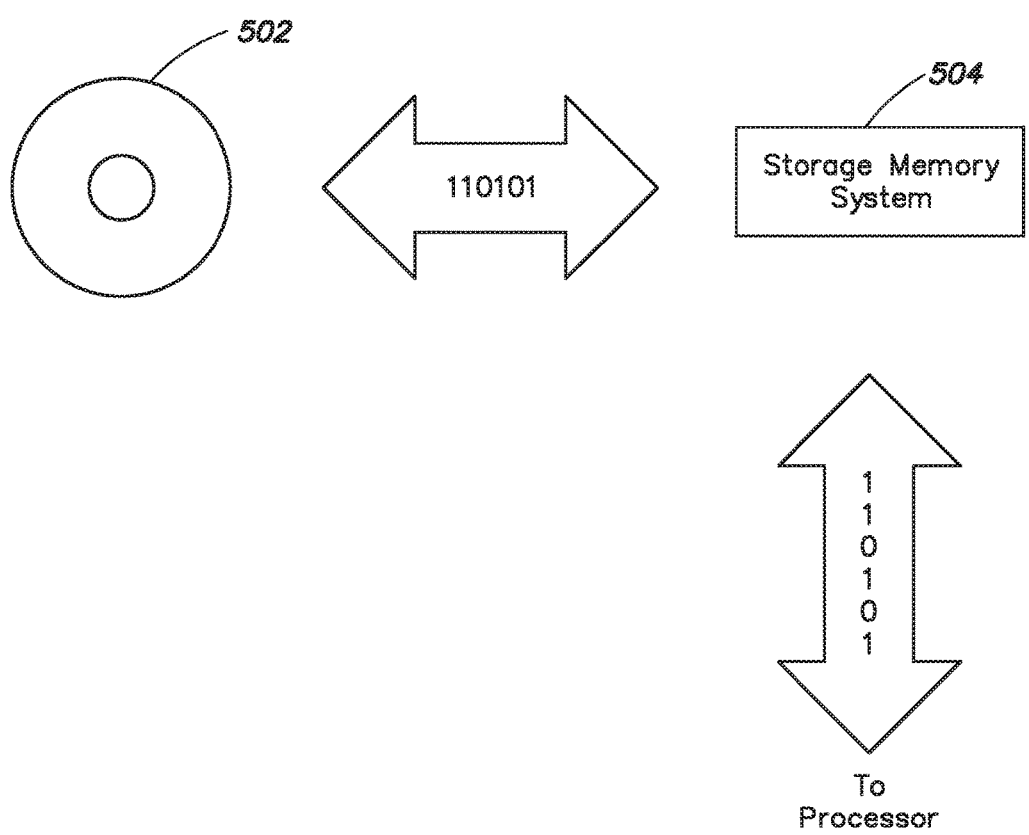
FIG. 5 is a block diagram of a computer data storage system with which various embodiments of the invention may be practiced.

The storage system 412, shown in greater detail in FIG. 5, typically includes a computer readable and writeable nonvolatile recording medium 502 in which signals are stored that define a program to be executed by the processor or information stored on or in the medium 502 to be processed by the program. The medium may, for example, be a disk or flash memory. Typically, in operation, the processor causes data to be read from the nonvolatile recording medium 502 into another memory 504 that allows for faster access to the information by the processor than does the medium 502. This memory 504 is typically a volatile, random access memory such as a dynamic random access memory (DRAM) or static memory (SRAM). It may be located in storage system 412, as shown, or in memory system 404. The processor 402 generally manipulates the data within the integrated circuit memory 404, 504 and then copies the data to the medium 502 after processing is completed. A variety of mechanisms are known for managing data movement between the medium 502 and the integrated circuit memory element 404, 504, and the invention is not limited thereto. The invention is not limited to a particular memory system 404 or storage system 412.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 4. Various aspects of the invention may be practiced on one or more computers having a different architecture or components that that shown in FIG. 4.

Computer system 400 may be a general-purpose computer system that is programmable using a high-level computer programming language. Computer system 400 may be also implemented using specially programmed, special purpose hardware. In computer system 400, processor 402 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described above, batch data replication processes may be overly cumbersome, slow and inefficient as the batch data replication process is not performed in real-time and the data is handled in relatively large segments. Therefore, embodiments described herein, provide a sequence engine capable of dynamically processing and re-sequencing out-of-sequence data replication records received in real-time. Embodiments described herein also provide a message throttle capable of controlling the flow of data into the sequence engine to prevent the loss of data captured in real-time.

What is claimed is:

1. A method for data replication between a first database and a second database, comprising:
receiving, at a local queue of a sequence engine, captured data from a first database in a first sequence, the captured data including a plurality of individual messages, each one of the plurality of individual messages including sequence information representative of a chronological order in which the plurality of individual messages was captured;
forwarding the first sequence of captured data to a coupling facility of the sequence engine;
storing the captured data in the first sequence at a first one of a plurality of data tables at the coupling facility;
resequencing, by a dispatcher of the sequence engine based on the sequence information in the captured data, the captured data into a second sequence, wherein the second sequence corresponds to the chronological order in which the plurality of individual messages were captured, wherein the sequence information includes a sequence number, and wherein the method further comprises modifying each of the plurality of individual messages to include the sequence number; and
replicating the captured data for a second database by forwarding the re-sequenced captured data to the second database in the second sequence, the method further comprising:
generating a control file that includes the sequence numbers of each of the modified plurality of individual messages and identifying, based on the sequence numbers, the second sequence by which each of the plurality of individual messages should be forwarded to the second database;
storing the converted and modified plurality of individual messages and the control file in a caching mechanism of the sequence engine; and
resequencing the converted and modified plurality of individual messages into the sequence identified in the control file.

2. The method of claim 1, further comprising performing data replication between a source Information Management System (IMS) database and a destination DB2 database.

3. The method of claim 1, further comprising capturing the data received from a message broker.

4. The method of claim 3, further comprising: executing by the message broker an asynchronous process with multiple instances to convert the captured data into a format to be stored at the second database.

5. The method of claim 1, further comprising: capturing the plurality of individual messages at the first database in real-time.

6. The method of claim 1, wherein the act of re-sequencing comprises:
- comparing the sequence number of each one of the converted and modified plurality of messages within the caching mechanism to a sequence number identified by the sequence in the control file as associated with the next sequential message to be forward to the second database; and
- in response to a determination that the sequence number of a message matches the sequence number identified by the control file, retrieving the message associated with the matched sequence number from the caching mechanism; wherein:
- the act of forwarding includes forwarding the message associated with the matched sequence number to the second database.

7. The method of claim 6, further comprising an act of:
- in response to receiving confirmation that the message associated with the matched sequence number has been successfully applied to the second database, updating, based on the sequence within the control file, the sequence number identified in the control file as associated with the next sequential message to be forwarded to the second database.

8. The method of claim 6, wherein the act of updating includes incrementing the sequence number identified in the control file as associated with the next sequential message to be forwarded to the second database.

9. The method of claim 6, wherein the act of receiving the converted and modified plurality of messages with the sequence engine includes:
- storing the received messages in a queue;
- monitoring, with a queue throttle, the number of messages stored in the queue;
- preventing, with the queue throttle, additional messages from being stored in the queue in response to a determination that the number of messages stored in the queue is greater than a first threshold; and
- allowing, with the queue throttle, additional messages to be stored in the queue in response to a determination that the number of messages stored in the queue is less than a second threshold.

10. The method of claim 1, further comprising: upon receiving an indication that the individual message forwarded to the second database was successfully applied to the second database, a service client is configured to update, within the control file, the identification of the sequence information associated with the next sequential message to be forwarded to the second database in the second sequence.

11. The method of claim 1, further comprising:
- transferring the converted and modified plurality of individual messages in the first sequence from the local queue to the first one of the plurality of data tables.

12. The method of claim 1, further comprising: converting, by a message broker, the modified plurality of individual messages into a format of the second database.

13. A method for data replication comprising:
- receiving at a local queue captured data in a first sequence, the captured data including a plurality of individual messages, each one of the plurality of individual messages including sequence information representative of a chronological order in which each one of the plurality of individual messages was captured;
- configuring a first one of a plurality of data tables to store the modified plurality of individual messages in the first sequence;
- resequencing the captured data into a second sequence based on the chronological order by which each one of the plurality of individual messages was received and for replicating the captured data for a destination database in the second sequence;
- configuring a configuration control system to receive the captured data and to modify each one of the plurality of individual messages to include the sequence information; and
- configuring a message broker in communication with the configuration control system to receive the modified plurality of individual messages from the configuration control system, to convert the modified plurality of individual messages into a format of the destination database, and to transmit the converted and modified plurality of messages captured data to the sequence engine.

* * * * *